3,166,583
ARALKYLCYANOFORMS
Elmore L. Martin and John K. Williams, Wilmington,
Del., assignors to E. I. du Pont de Nemours and Company, Wilmington, Del., a corporation of Delaware
No Drawing. Filed May 1, 1962, Ser. No. 191,449
6 Claims. (Cl. 260—465)

This invention relates to organic compounds, having a plurality of cyano groups, that are useful in thermographic applications. More particularly, the invention relates to new compounds having three cyano groups attached to a single carbon atom and to a method for their preparation.

Thermographic processes, i.e., processes for reproducting writing, printing or other images by application of heat, are employed in certain systems of reproducing written records. Several types of compounds have been proposed for use in such processes and they have achieved varying degrees of success. To be of practical value in such processes, the thermographic compositions should have a long shelf life, i.e., they should be able to be stored for long periods of time at ordinary storage temperatures without deterioration, and should also be capable of rapid color development at the temperatures employed in the thermographic process. Many of the presently known thermographic compositions are deficient in the range between the temperature at which they are stable and the temperature at which color is developed. Therefore, new compounds displaying improved thermographic characteristics would constittue valuable contributions to the art.

It is an object of this invention to provide compounds which are useful in thermographic applications. It is a further object of this invention to provide new compounds having improved thermographic characteristics and other valuable properties. A still further object of this invention is to provide a process for preparing said compounds. Other objects will appear hereinafter.

These and other objects of this invention are accomplished by providing new and useful polycyano compounds. These novel compounds are aralkylcyanoforms of the formula

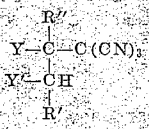

wherein R' and R" are hydrogen, alkyl or aryl, and Y is hydrogen or an aryl, alkaryl, alkoxyaryl, dimethylaminoaryl or chloroaryl radical and Y' is hydrogen or an alkyl, aryl, alkaryl, alkoxyaryl, dimethylaminoaryl or chloroaryl radical, with the proviso that at least one of Y and Y' is an aryl, alkaryl, alkoxyaryl, dimethylaminoaryl or chloroaryl radical and with the further proviso that the R', R", Y and Y' radicals each have a maximum of 18 carbon atoms.

The aralkylcyanoforms of this invention have the unusual and valuable characteristic of being stable in the solid form but are capable of decomposing to an olefin and free cyanoform (a strong acid) at elevated temperatures when in solution or in the molten form. This decomposition is illustrated by the equation:

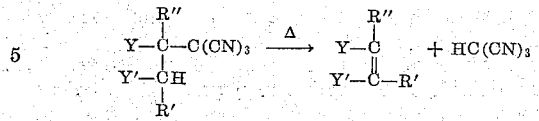

It is the ability of the compounds of this invention to liberate cyanoform under controlled conditions that makes the compounds useful in thermographic processes.

The aralkylcyanoforms of this invention are prepared by reaction of cyanogen chloride or cyanogen fluoride with a substituted malononitrile of the formula

wherein R', R", Y and Y' have the meanings specified above, in the presence of an acid acceptor, e.g., a metal salt of the substituted malononitrile, such as an alkali or alkaline earth metal salt. Thus, suitable acid acceptors are lithium, sodium, potassium, rubidium, cesium, magnesium and calcium compounds. Sodium and potassium are preferred since they are readily available in the form of alkoxides and form salts with the aromatic substituted malononitriles. The alkali metals are generally used as the alkoxides, although other alkali compounds such as alkali metal fluorides, and hydrides, and alkaline earth compounds such as calcium oxide can also be employed. Organic acid acceptors which can be employed are those which are non-reactive with cyanogen halides but which react with hydrogen fluoride or hydrogen chloride, e.g., acetonitrile or unsaturated hydrocarbons such as borynlene.

The reaction between the cyanogen halide, the halogen of which has an atomic number of 9 to 17, inclusive, and the aromatic substituted malononitrile is generally carried out in the presence of an inert solvent or diluent. Suitable solvents or diluents are those that are inert to the reactants or the acid acceptor under the reaction conditions. These include hydrocarbons, both aromatic and aliphatic, e.g., benzene, toluene, pentane, cyclohexane, etc.; ethers, e.g., diethyl ether, tetrahydrofuran, and dioxane; and halogenated hydrocarbons, e.g., carbon tetrachloride, methylene chloride, etc. The preferred solvents are those that can be separated from the reaction products by evaporation or by removal of the desired aralkylcyanoform by crystallization.

Formation of the aralkylcyanoform by the process described above requires one mole of cyanogen halide for each mole of substituted malononitrile. However, an excess of cyanogen halide is generally used in order to insure complete reaction of the substituted malononitrile. An excess of 10 to 50 mole percent is commonly employed when an inert solvent or diluent is employed in the reaction system. In some cases it is desirable to use a much larger excess, e.g., 5 or 10 times the theoretical molar equivalent, and in this case the excess cyanogen halide serves as the reaction medium.

Reaction takes place rapidly between the cyanogen halide and substituted malononitrile in the presence of an acid acceptor at ordinary or moderately elevated temperatures. Reaction is essentially completed in times ranging from 5 minutes to an hour or more at temperatures ranging from −30° to 100° C. The exact time required depends on the particular reactants and operating temperatures employed. The reaction is conveniently carried out at atmospheric pressure, but subatmospheric and superatmospheric pressures are equally operable. Superatmospheric pressure is especially advantageous when the higher reaction temperatures, e.g., 75–100° C., are employed and when low boiling reaction media are employed. With the most reactive substituted malononitriles the time of reaction can be controlled by the rate of addition of the cyanogen halide to the reaction system.

Cyanogen chloride is the preferred cyanogen halide reactant because of its ready availability. However, cyanogen fluoride can also be employed with satisfactory results.

The substituted malononitriles used as starting materials in the process of this invention can be prepared by known methods, such as those involving the reaction of a Grignard reagent with an alkylidene malononitrile in accordance with the following equation:

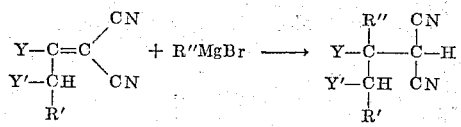

The preparation of a typical aralkylmalononitrile by this process is illustrated by the following description of the preparation of 1,1-dicyano-2-methyl-2-phenylpropane (also known as α,α-dimethylbenzylmalononitrile): A warm benzene solution of 1.1 moles of α-methylbenzylidenemalononitrile is added to a reaction vessel fitted with a reflux condenser, dropping funnel, mechanical stirrer, thermometer and nitrogen inlet tube, and charged with a 3 molar anhydrous diethyl ether solution of 1.2 moles of methylmagnesium bromide. External cooling is employed and the rate of addition of the benzene solution is adjusted so that a reaction temperature of 25–30° C. is maintained during the addition of the reactants. After addition is completed, the resulting homogeneous solution is stirred under nitrogen at 45–48° C. for 1 hour. At the end of this time, the reaction mixture gives a positive test for Grignard reagent by the Michler ketone test. The thick reaction mixture is poured onto excess ice and is carefully acidified by the addition of 20% sulfuric acid. The aqueous layer is separated and extracted once with a mixture of ether and benzene. The combined organic layers are washed twice with water containing a few drops of dilute hydrochloric acid, then with two portions of saturated sodium chloride solution. After drying with anhydrous magnesium sulfate, the filtrate is concentrated and distilled under reduced pressure to yield α,α-dimethylbenzylmalononitrile, B. P. 105–107° C./0.25 mm., in a yield amounting to 78–79% of theory.

Another method for the preparation of aralkylmalononitriles is illustrated by the following description of the preparation of β-phenylethylmalononitrile starting with ethyl cyanoacetate. Ethyl cyanoacetate is reacted in absolute ethanol solution with sodium and β-phenylethylbromide at 65°–80° C. to form ethyl β-phenylethylcyanoacetate which is then treated with concentrated ammonium hydroxide at 25° C. to form β-phenylethylcyanoacetamide. A mixture of 0.8 mole of β-phenylethylcyanoacetamide, sodium chloride and 1,2-dichloroethane is stirred at room temperature for 5 minutes and then 0.5 mole of phosphorus oxychloride is added. The mixture is heated at reflux temperature with mechanical stirring for 8 hours. The reaction mixture is filtered and the filter cake is washed with 1,2-dichloroethane. Ice-water is added and the mixture is stirred to hydrolyze excess phosphorus oxychloride. Solid sodium bicarbonate is added in small portions until the aqueous layer is neutral. The organic layer is separated and washed with aqueous sodium bicarbonate. After drying with anhydrous magnesium sulfate the filtrate is concentrated and the residue is distilled. There is obtained a 78% yield of β-phenylethylmalononitrile boiling at 109–110° C./0.2 mm. The compound solidifies on standing at room temperature and melts at 44–46° C.

*Analysis.*—Calc'd for $C_{11}H_{10}N_2$: C, 77.62%; H, 5.92%; N, 16.46%. Found: C, 77.97%; H, 6.09%; N, 16.49%.

The products and process of this invention are illustrated in further detail in the following examples.

EXAMPLE I

*Preparation of α,α-dimethylbenzylcyanoform*

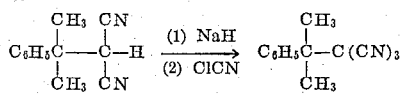

To a suspension of 4.8 g. (0.2 mole) of sodium hydride (9.6 g. of 50% dispersion in oil) in 250 ml. of ether is added 36.8 g. (0.214 mole) of α,α-dimethylbenzylmalononitrile. The yellow suspension is stirred for 15 minutes and then 15 g. (0.24 mole) of cyanogen chloride is passed into the reaction mixture. The mixture is stirred for 15 minutes after the cyanogen chloride is added and the resulting solid that is formed (sodium chloride) is removed by filtration. The filtrate is concentrated to a volume of 100 ml. and is then cooled in a bath of solid carbon dioxide and acetone. The solid that crystallizes is collected, washed with petroleum ether and recrystallized from cyclohexane. There is obtained 22.4 g. of α,α-dimethylbenzylcyanoform, M.P. 105–106° C. This product can also be named 1,1,1-tricyano-2-methyl-2-phenylpropane. A small sample is prepared for analysis by an additional crystallization from cyclohexane. This recrystallized material has a melting point of 106.2–107° C.

*Analysis.*—Calc'd for $C_{13}H_{11}N_3$: C, 74.7%; H, 5.30%; N, 20.1%. Found: C, 73.9%; H, 5.26%; N, 20.2%.

EXAMPLE II

*Preparation of β-phenylethylcyanoform*

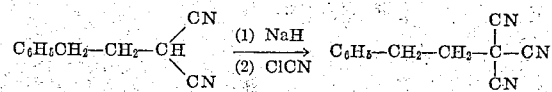

β-Phenylethylmalononitrile (17.0 g., 0.1 mole) is reacted with 2.4 g. (0.1 mole) of sodium hydride in 100 ml. of tetrahydrofuran at 0–5° C. Into the resulting solution is distilled 7.0 g. (0.114 mole) of cyanogen chloride. The resulting yellow neutral solution is concentrated under reduced pressure and water is added to the residue. The solid obtained is stirred with a small amount of water, filtered, and washed with cold water. The filter cake is dissolved in ether and the solution is treated with decolorizing carbon and anhydrous magnesium sulfate. The filtered solution is concentrated to a volume of about 30 ml. and cooled first in ice and then in a mixture of solid carbon dioxide and acetone to −60° C. There is obtained 14 g. (72% of theory) of colorless crystals of β-phenylethylcyanoform (alternatively named 1,1,1-tricyano-3-phenylpropane, M.P. 47–49° C. Crystallization from ether does not change the melting point.

*Analysis.*—Calc'd for $C_{12}H_9N_3$: C, 73.83%; H, 4.65%; N, 21.53%. Found: C, 73.90%; H, 4.65%; N, 21.67%.

These examples illustrate the preparation of two specific aralkylcyanoforms of this invention. However, the invention includes any aralkylcyanoform of the formula

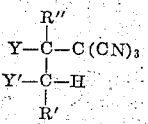

wherein R′, R″, Y and Y′ have the meanings defined hereinbefore. Thus, when the process of the examples is repeated with a molar equivalent of the substituted malononitriles listed in the first column of Table I, replacing the α,α-dimethylbenzylmalononitrile of Example I, or the β-phenylethylmalononitrile of Example II, and reacted with at least one molar equivalent of cyanogen chloride or cyanogen fluoride there are obtained the aralkylcyanoforms listed in the second column of this table.

TABLE I.—PREPARATION OF ARALKYLCYANOFORMS

| Reactants | Products |
| --- | --- |
| A-Methylbenzylmalononitrile | A-Methylbenzylcyanoform. |
| A-Methyl-p-dimethylamino-benzylmalononitrile. | A-Methyl-p-dimethyl-aminobenzylcyanoform. |
| A-Methyl-p-chlorobenzyl-malononitrile. | A-Methyl-p-chlorobenzyl-cyanoform. |
| A-Methyl-p-methoxybenzyl-malononitrile. | A-Methyl-p-methoxybenzyl-cyanoform. |
| A-Benzylbenzylmalononitrile | A-Benzylbenzylcyanoform. |
| A-Methyl-A-phenylbenzyl-malononitrile. | A-Methyl-A-phenylbenzyl-cynaoform. |
| A-Stearylbenzylmalononitrile | A-Stearylbenzylcyanoform. |
| 1-Methyl-1-(A-naphthyl)-propyl-malononitrile. | 1-Methyl-1-(A-naphthyl)-propyl-cyanoform. |
| A-Methyl-A-ethyl-p-methyl-benzylmalononitrile. | A-Methyl-A-ethyl-p-methyl-benzylcyanoform. |
| 1-Phenyl-2-hexylmalononitrile | 1-Phenyl-2-hexylcyanoform. |
| 1-(p-Methoxyphenyl)-2-phenyl-ethylmalononitrile. | 1-(p-Methoxyphenyl)-2-phenyl-ethylcyanoform. |

The products of this invention possess the unexpected and valuable property of being stable in the solid state at temperatures up to their melting points. On the other hand, compounds of this invention when in solution, e.g., in water or in methanol, at room temperature and when in the molten state decompose to an olefin and cyanoform (a strong acid). This ability to liberate a strong acid on heating makes the compounds of particular value as ingredients in thermographic compositions where the liberation of the strong acid on heating can be used to develop a color. This is illustrated in further detail as follows. A small sample of crystal violet lactone,

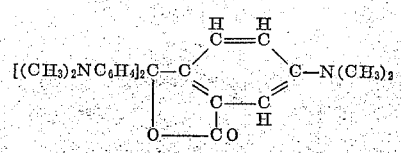

is mixed with α,α-dimethylbenzylcyanoform on a piece of filter paper. The piece of paper containing these two compounds is moistened with acetone and allowed to dry in the air. The filter paper is then placed on a hot plate whereupon it becomes deep blue in color.

The hitherto known arylcyanoforms and aralkylcyanoforms do not decompose in this way and thus are of no value in thermographic compositions. This is illustrated by the following test: A small sample of crystal violet lactone is mixed with benzylcyanoform (a known compound) on a piece of filter paper. The paper is then moistened with acetone and allowed to dry in the air. The dry, impregnated filter paper is then placed on a hot plate (at the same temperature as that in the preceding paragraph). In this case, the paper shows no blue color but eventually chars to a pale, tan color.

The aralkycyanoforms of this invention are also useful as cationic polymerization initiators. In this application, the aralkylcyanoform is incorporated with the ethylenically unsaturated monomer to be polymerized. The mixture is then heated to the temperature at which the particular aralkylcyanoform liberates cyanoform which in turn initiates the polymerization of the unsaturated monomer.

The aralkylcyanoforms of this invention are also useful as ingredients of a thermal cell that is inert at room temperature, but develops a potential when heated near the melting point of the cyanoform. This is illustrated in further detail as follows:

On a hot plate whose temperature can be controlled within ± 1° C. of the desired temperature is placed a sheet of polytetrafluoroethylene as an insulator, followed in succession by a copper slab making good electrical contact with a graphite slab (2 in. by 1¾ in.) forming the cathode, a mat of glass fibers on which is laid a magnesium sheet (3 in. by 2 in.) forming the anode, and finally another insulating sheet of polytetrafluoroethylene. The individual sections of the cell are maintained in good contact by placing a steel block 3 in. x 3 in. x 6 in. on top of the assembly. The temperature of the cell is measured by means of a thermocouple inserted into the graphite cathode. The open circuit voltage is measured by a high impedance vacuum tube voltmeter. Also, a decade resistor box is placed in series with the cell and a Keithley electrometer so that the cell's behavior in discharge can be determined. The cell assembly is first conditioned by heating it to 200° C. and then cooling it. A 0.2 g. sample of α,α-dimethylbenzylcyanoform is dispersed in the center of the glass fiber mat and the cell is heated at a rate of about 1° C. per minute. During this heating, the voltage is observed as a function of temperature. It remains at zero until a temperature of 118±1° C. is reached, at which point it rises to 0.98 volt (open circuit) in a period of about one-half minute. The voltage remains steady for about 3-4 minutes, then declines steadily and reaches 0.14 volt in an additional ten minutes. In this particular assembly the voltage and temperature are simultaneously recorded on a twin channel recorder. The internal resistance of this recorder is low enough ($-10^5$ ohms) so that the cell is in effect being continually discharged while what should be open-circuit voltage is being produced. Under more favorable conditions, the true open-circuit voltage would have been maintained for 30 minutes or more with intermittent discharging.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed as defined as follows:

We claim:

1. An aralkylcyanoform compound of the formula

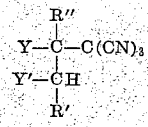

wherein

R' and R" are members selected from the class consisting of hydrogen, alkyl and aryl, Y is a member selected from the class consisting of hydrogen, aryl, alkaryl, alkoxyaryl, chloroaryl, and dimethylaminoaryl, Y' is a member selected from the class consisting of hydrogen, alkyl, aryl, alkaryl, alkoxyaryl, chloroaryl, and dimethylaminoaryl provided that at least one of Y and Y' is a member selected from the class consisting of aryl, alkaryl, alkoxyaryl, dimethylaminoaryl and chloroaryl, and provided that R', R", Y, and Y' each contains not more than 18 carbon atoms.

2. An aralkylcyanoform compound of the formula

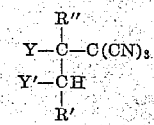

wherein

Y' and R" are hydrogen,
R' is alkyl,
Y is alkoxyaryl, and
R' and Y each contains not more than 18 carbon atoms.
3. α,α-Dimethylbenzylcanoform.
4. α-Methyl-p-dimethylaminobenzylcyanoform.
5. α-Benzylbenzylcyanoform.
6. β-Phenylethylcyanoform.

References Cited in the file of this patent
UNITED STATES PATENTS
2,995,597     Williams _____ Aug. 8, 1961